Sept. 19, 1961 M. V. KALFAIAN 3,001,150
TIME BASE GENERATOR
Filed Nov. 10, 1958
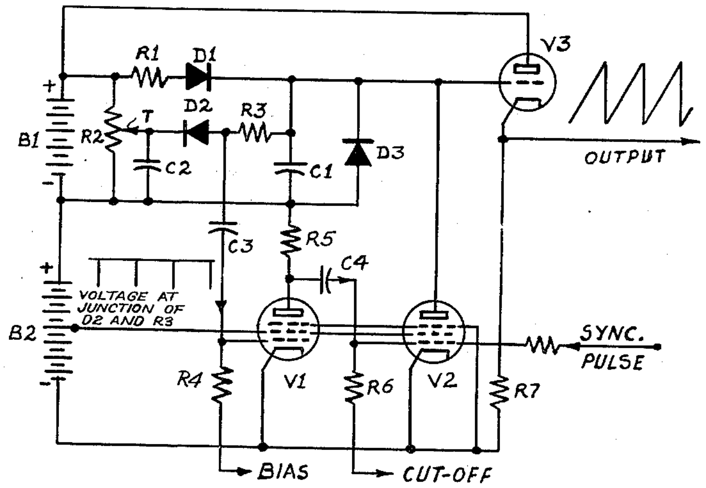
TIME BASE GENERATOR
INVENTOR.
Migran V. Kalfaian United States Patent Office 3,001,150
Patented Sept. 19, 1961

3,001,150
TIME BASE GENERATOR

Meguer V. Kalfaian, 962 Hyperton Ave., Los Angeles 29, Calif.

Filed Nov. 10, 1958, Ser. No. 773,063
6 Claims. (Cl. 331—153)

This invention relates to time base generating systems, and particularly to a circuit arrangement for generating time base waves at prescribed frequencies without being affected by variations in supply voltages. Its main object is to provide a circuit arrangement for generating time base waves, whose terminating trigger actions depend upon a voltage-ratio, rather than a coincidence voltage with a reference voltage, thereby maintaining said ratio constant regardless of supply voltage variations.

Time base generators usually depend on some reference potential as a coincidence level to impart flyback triggering action to a rising potential. The time constant of the rising potential may be kept substantially stabilized by temperature compensated component parts, but the reference potential requires complicated circuitry for stabilization. Such complicated circuitry often becomes prohibitive to be incorporated with commercially produced electronic devices, due to high cost of production. Accordingly, it is the object of the present invention to provide a simple arrangement, wherein, said flyback triggering action of a rising potential is determined by a pre-fixed voltage-ratio, rather than coincidence of said rising potential with that of a reference potential. In one example of time base saw-tooth wave generation, there is utilized a thyratron tube, the control grid of which is normally biased to prevent anode current flow. When a rising potential upon this anode reaches a critical level to cause anode current flow, ionization of the gas takes place, and fast flyback triggering of the rising potential is effected; without regard to the bias on the control grid. In this case, the flyback triggering depends upon the ionization point of the gas, and due to unstable characteristics of gaseous tubes, precise generation of time base waves is not obtainable. Blocking oscillators are used to produce time base saw tooth waves, but these are also subject to frequency drift due to supply voltage changes, and bias changes; furthermore, the waveform obtainable is not the ideal. According to this invention, however, and in its broader aspects, a capacitor is charged with a linear potential rise in series with a resistor across a potential source. A coupling means is provided from the junction point between said resistor and the capacitor to a fixed voltage-dividing tap across said potential source, in a manner that, a pulse potential is developed in said coupling means when the rising potential in said capacitor is equal to or higher than the potential at said tap. This pulse potential is then amplified for the operation of a discharger device for said capacitor, in a manner that, the pulse is regenerated during discharge of the capacitor, and thereby continually increasing the discharge speed for fast flyback triggering action. Since the voltage-ratio at said tap remains constant regardless how much the supply voltage varies, the triggering point of the rising potential is maintained unchanged, irrespective of supply voltage variations. This function will be more fully described in the following specification by way of the accompanying schematic arrangement of the figure.

In the figure, a capacitor C1 is charged to the potential of B1 in series with resistor R1, and diode D1. The speed with which this capacitor is charged depends upon the RC time constant of resistor R1 and capacitor C1, neglecting the internal resistance of D1. As the rising potential in capacitor C1 is expected to be exponential, it may be considered that during 60% of the total charge the potential rise is linear. Accordingly, a voltage-dividing tap T may be adjusted at about 60% of the potential source B1, across variable resistor R2. The voltage at this tap may be bypassed by a large capacitor C2, so as to eliminate response to any signal potential that may develop thereat. The rising potential across capacitor C1 is coupled to the potential at tap T by resistor R3 in series with diode D2, so polarized that, current flows through the latter circuit when the voltage across the capacitor C1 rises above the voltage at tap T. In such an arrangement, assume that the voltage across capacitor C1 is rising from a minimum value. When this voltage is equal and higher than the voltage at tap T, current starts flowing through resistor R3 in series with diode D2. At this instant, a negative potential is developed at the junction terminal of D2, R3, and this negative potential is transmitted to the control grid of normally conducting vacuum tube V1 from across load resistor R4 through coupling capacitor C3. The last said negative voltage is amplified in the anode circuit resistor R5 of tube V1, in positive polarity, and is further transmitted to the control grid of vacuum tube V2 from across load resistor R6 through coupling capacitor C4. The positive anode potential of V2 is supplied by the potential of source B2, in series with the capacitor C1, which makes the anode potential of V2 equal to the potential of B2 plus the charged potential of capacitor C1. The control grid of vacuum tube V2 is normally biased to anode current cut-off, so that the normal charge across C1 is not pulled back by any conduction of V2. When the potential across C1 reaches the potential at tap T and higher, however, the negative potential developed at the junction terminal of D2 and R3 is transmitted to the control grid of V2 in positive polarity; rendering said tube conductive. Initially, the arriving positive potential drives the vacuum tube V2 to the threshold of conduction, which, due to the high potential of supply source B2, starts discharging capacitor C1. At the instant C1 starts discharging, a negative potential is added to the junction terminal of D2 and R3, which further adds to the threshold conduction of V2. This additional conduction further speeds up the discharge of C1, with additional regeneration. Such regeneration causes high speed discharge of capacitor C1, and according to experimental data, the time delay of discharge may be made negligible for most practical purposes.

After the capacitor C1 is completely discharged from its previous charge, it now starts charging in reverse polarity through V2 and the supply potential of B2. In order to avoid this reversed charge across capacitor C1, a diode D3 is connected in parallel with C1, so polarized that, D3 remains idle while C1 is charging through D1 and R1, and it draws current when C1 is charging through B2 and V2; thus preventing recharge of C1 in said reverse polarity. When diode D3 is chosen having high forward current characteristics, the amount of reverse charge in capacitor C1 may be negligible, and a saw-tooth wave having straight flyback termination, such as shown by the graphical illustration at the output of cathode follower tube V3, may be obtained. In this case, it will be noted that the negative potential developed at the junction terminal of diode D2 and resistor R3, will be in the form of narrow pulses, as shown by the graphical illustration adjacent to coupling capacitor C3. When the saw-tooth waves produced at the output of cathode follower tube V3 is to be synchronized with another wave source, then synchronizing pulses may be applied to the control grid of discharger tube V2, as shown in the drawing, or, these synchronizing pulses may be applied to an additional tube connected in parallel with tube V2; the arrangement of which is simple enough to be understandable to the skilled in the art, and accordingly, further drawing is not found necessary to be included herein.

Referring to the schematic arrangement of the figure, it will be noted that the flyback triggering occurs when the voltage across capacitor C1 has risen equal to the voltage at tap T, and the time of said voltage rise is fixed by the RC time constant of R1 and C1. Since the voltage ratio at this tap remains constant, no matter how widely the potential of source B1 has changed, the timing of the saw-tooth wave also remains constant, as long as the original values of said resistor and capacitance remain constant. Thus, utility is also rendered by varying the potential amplitude of source B1 in order to vary the amplitude of saw-tooth wave without affecting the frequency rate of same.

In the figure, the diode D1 may be eliminated completely, if so desired, without affecting above said operating conditions. The coupling capacitor C3 is preferably chosen of much smaller value than the capacitor C1, so as to reduce loading effect upon the latter during slow time base voltage rise period. Also, the value of loading resistor R4 should be chosen high, but not to a point where phase delay may occur of the discharge across coupling capacitor C3 during charging period of capacitor C1, no matter how small it may be, so as to avoid time delay of the negative pulse developed across coupling capacitor C3 during discharge period of the capacitor C1. It will be noted, however, that the negative pulse voltage across coupling capacitor C3 must have fast recovery for very narrow pulses. In the case when the value of loading resistor R4 is too high, a diode may be connected in parallel with resistor R4; the cathode end of the diode being terminated to the control grid of amplifier tube V1. Also, the recovery time of coupling capacitor C3 may be shortened by the use of a normally inoperative triode with its cathode connected to the control grid of V1, and the anode connected to a positive potential. This triode tube may then be rendered conductive by an arrow pulse obtained from across a small resistor connected in series with the anode terminal of diode D3. The last said resistor is not shown in the drawing, but when used its value should be small, so as to avoid appreciable charge of the capacitor C1 in reversed polarity. Also, when said resistor is used, the pulse voltage developed across it will be in negative polarity, which may be amplified to positive polarity for the operation of said triode discharger tube. In FIG. 1, a cathode follower tube V3 is shown for an output across a low impedance cathode circuit resistor R7. However, this tube may be eliminated, and the saw-tooth wave across capacitor C1 may be utilized according to a particular use.

Having thus described the invention with only exemplary modes of operaiton, and parts utilized therefor, which may be revised without departing from the spirit and scope of the invention, I claim:

1. In a repetitious voltage wave production system where the starting point of each wave depends upon a reference voltage, the system of maintaining this reference voltage constant regardless of the variations in the source derived from, which comprises a parent voltage source; means for deriving a first voltage-ratio from across the parent voltage source; a network across said parent voltage source for producing a rising voltage across the parent voltage; means for deriving a second voltage-ratio from said rising voltage; a comparison means between the first and second voltage-ratios and means therefor for deriving a signal pulse when the second voltage-ratio is negligibly larger than the first voltage-ratio; and means utilizing said signal pulse for the starting point of said rising voltage, thereby rendering said starting point dependent solely upon the differences in said voltage-ratios regardless of the variations in said parent voltage source.

2. A timing circuit for producing repetitious waves of required shape at predetermined time intervals comprising a first voltage source; a series-connected resistance-capacitance network, connected across said first voltage source, thereby effecting charge of the capacitor to the peak voltage of said source during a time period depending upon the time constant of said network; a voltage-dividing tap across said first source; a polarized coupling means between said capacitor and said tap, adapted to produce an output pulse when the rising voltage is higher than the voltage at said tap; a second voltage source electrically connected in series with the first voltage source; a normally inoperative discharger device for said capacitor, electrically connected in series with the capacitor and said second voltage source, said device polarized for current flow when operated; means for applying said pulse upon said discharger device for operation and discharge of said capacitor; and a unidirectional-current flow electric discharge device across said capacitor, so polarized as to represent high impedance across the capacitor when in charging direction through said first voltage source, but to represent low impedance in the direction when charging through said second voltage source after completion of the discharge across said capacitor.

3. A timing circuit for producing repetitious waves of required shape at predetermined time intervals comprising a voltage source; a voltage dividing tap across said source; a series connected resistance-capacitance network connected across said voltage source, thereby effecting charge of the capaictor to the peak voltage of said source during a time period depending upon the time constant of said network; coupling means comprising a series connected rectifier and resistor between said capacitor and said tap, said rectifier being polarized for current flow only when the voltage at said capacitor is higher than the voltage at said tap; a coupling-capacitor of such value as to represent a high impedance to the voltage rise time-base rate across said capacitor, but low impedance to the sudden current flow through said coupling means, thereby transmitting a short voltage-pulse at the time when the voltage at said capacitor is higher than the voltage at the tap; a normally inoperative discharger device for said capacitor; and means for applying said pulse to the discharger device for energizing same, whereby a new charge commences at a repetition rate depending only upon the time constant of said network and the voltage level at said tap.

4. The circuit as set forth in claim 2, wherein is included means for producing regenerative electrical path between said output pulse and said discharger means, so that during discharge of said capacitor the magnitude of said pulse increases regeneratively for increasing the energization of the discharger means, thereby regeneratively increasing the rate of said discharge.

5. The circuit as set forth in claim 2, wherein said discharger device consists of a varaible impedance thermionic device; and means for producing regenerative electrical path between said pulse and last said device, so that during discharge of said capacitor the magnitude of said pulse increases regeneratively for decreasing the impedance of last said device, thereby regeneratively increasing the rate of said discharge.

6. The circuit as set forth in claim 3, wherein said discharger device consists of a variable impedance thermionic device; and means for producing regenerative electrical path between said pulse and last said device, so that during discharge of said capacitor the magnitude of said pulse increases regeneratively for decreasing the impedance of last said device, thereby regeneratively increasing the rate of said discharge.

References Cited in the file of this patent

UNITED STATES PATENTS

| | | |
|---|---|---|
| 2,266,516 | Russell | Dec. 16, 1941 |
| 2,427,750 | Snyder | Sept. 23, 1947 |
| 2,695,955 | Casey | Nov. 30, 1954 |
| 2,729,766 | Vilkomerson | Jan. 3, 1956 |
| 2,739,308 | Lee | Mar. 20, 1956 |